United States Patent [19]
Archer et al.

[11] Patent Number: 5,820,150
[45] Date of Patent: Oct. 13, 1998

[54] INDEPENDENT SUSPENSIONS FOR LOWERING HEIGHT OF VEHICLE FRAME

[75] Inventors: David W. Archer; Brian K. Anderson, both of Oshkosh; Eric E. Braun, Neenah; James L. Steiner; Donald H. Verhoff, both of Oshkosh, all of Wis.

[73] Assignee: Oshkosh Truck Corporation, Oshkosh, Wis.

[21] Appl. No.: 681,239

[22] Filed: Jul. 22, 1996

Related U.S. Application Data

[63] Continuation-in-part of Ser. No. 421,995, Apr. 14, 1995, Pat. No. 5,538,274, which is a continuation of Ser. No. 46,623, Apr. 14, 1993, abandoned.

[51] Int. Cl.⁶ .............................. B60G 3/20; B60G 7/00; B60G 11/14
[52] U.S. Cl. ........................ 280/124.138; 280/124.141; 280/124.136; 280/93.512; 267/141.2
[58] Field of Search ...................... 280/663, 666, 280/673, 674, 675, 670, 660, 691, 690, 696, 701, 726, 725, 724, 124.134, 124.135, 124.136, 124.138, 124.141, 124.15, 124.179, 93.512; 267/141.2, 141.3, 279, 281

[56] References Cited

U.S. PATENT DOCUMENTS

| | | | |
|---|---|---|---|
| 2,321,832 | 6/1943 | Leighton | 280/666 |
| 2,631,044 | 3/1953 | Booth | 280/674 |
| 2,846,234 | 8/1958 | Steinkamp et al. | 280/666 |
| 4,271,922 | 6/1981 | Kishline | 280/666 |
| 4,714,270 | 12/1987 | Rumpel | 280/701 |
| 4,826,203 | 5/1989 | Kijima et al. | 280/690 |
| 4,848,788 | 7/1989 | Rumpel | 280/675 |
| 4,848,789 | 7/1989 | Timoney et al. | 280/701 |
| 4,989,894 | 2/1991 | Winsor et al. | 280/690 |
| 5,062,654 | 11/1991 | Kakimoto et al. | 280/673 |

FOREIGN PATENT DOCUMENTS

| | | | |
|---|---|---|---|
| 546609 | 6/1993 | European Pat. Off. | 280/674 |
| 1051204 | 1/1954 | France | 280/670 |
| 276313 | 10/1951 | Switzerland | 280/666 |

*Primary Examiner*—Peter C. English
*Attorney, Agent, or Firm*—Baker & McKenzie

[57] ABSTRACT

A modular independent coil spring suspension for steerable and non-steerable wheel assemblies and driven and non-driven axles. The suspension is of the general type in which each wheel has an upper and a lower control arm, and a single coil spring secured between the lower of the two control arms and the chassis. The upper and lower control arms each have inner ends split into two segments, each of which is connected to the vehicle frame by a special bushing assembly. The suspension has a novel upper control arm which is split into two segments, each segment being bent to accommodate an edge of the frame of the vehicle, thereby allowing the frame of the vehicle to be mounted lower with respect to the wheel assemblies.

7 Claims, 14 Drawing Sheets

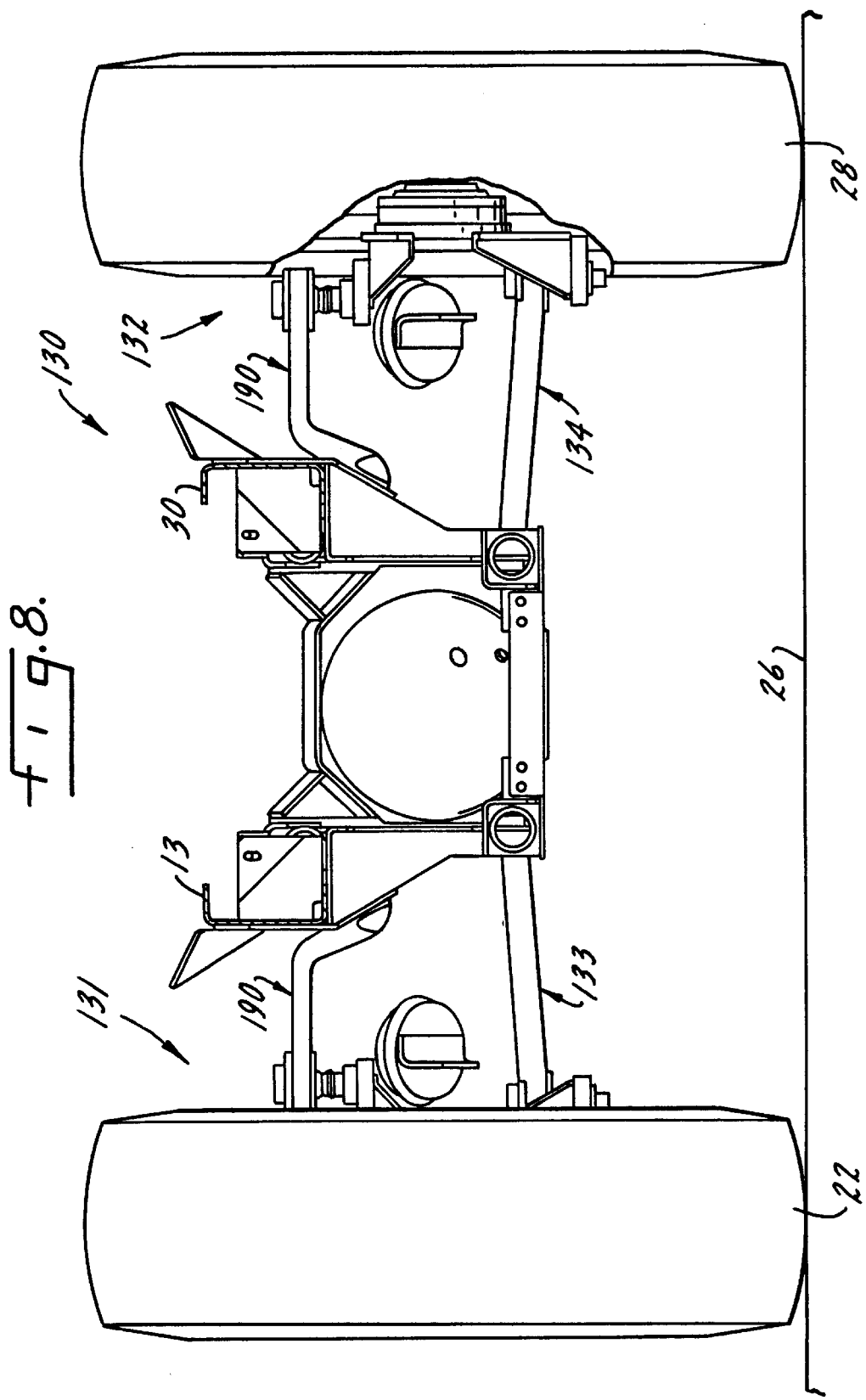

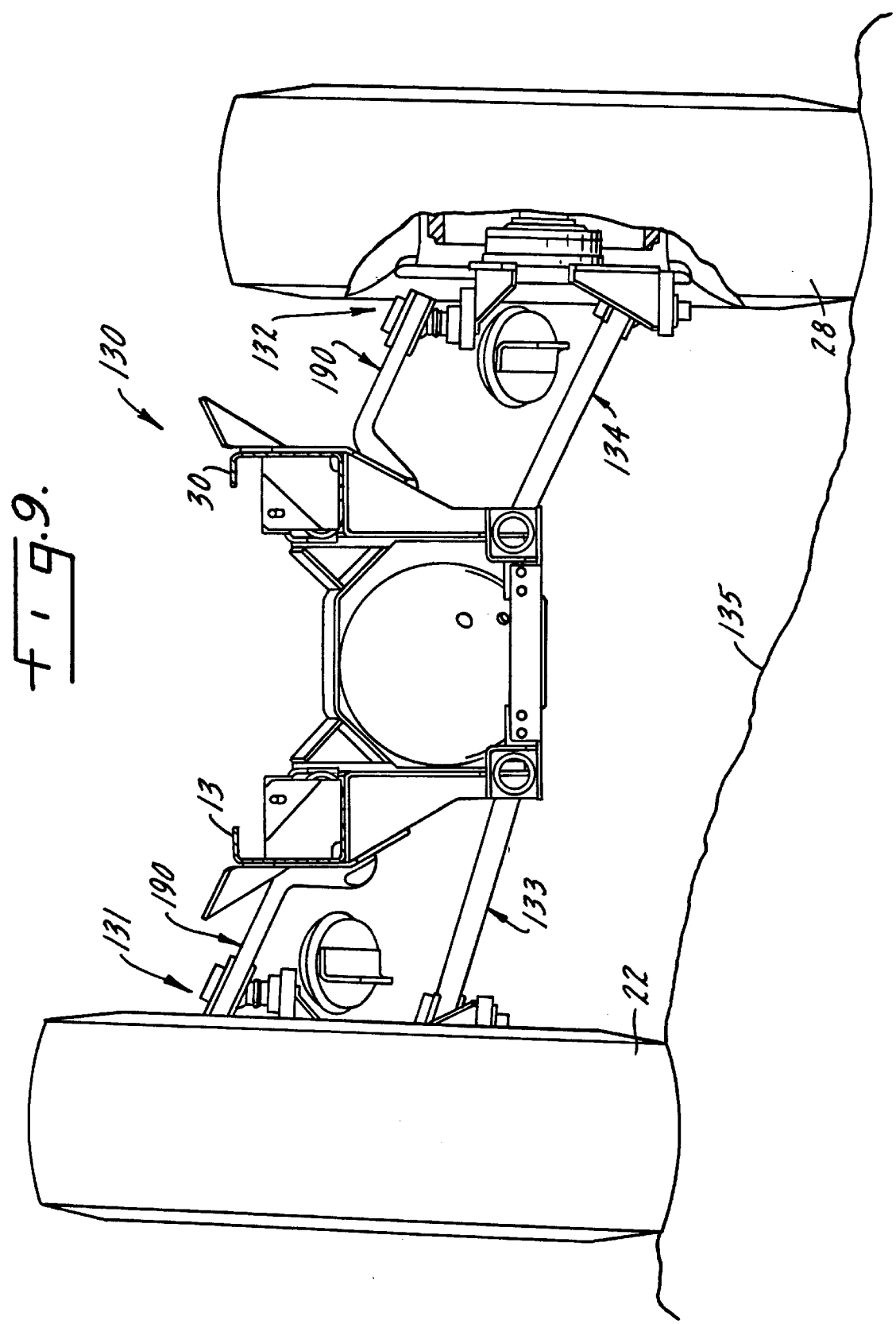

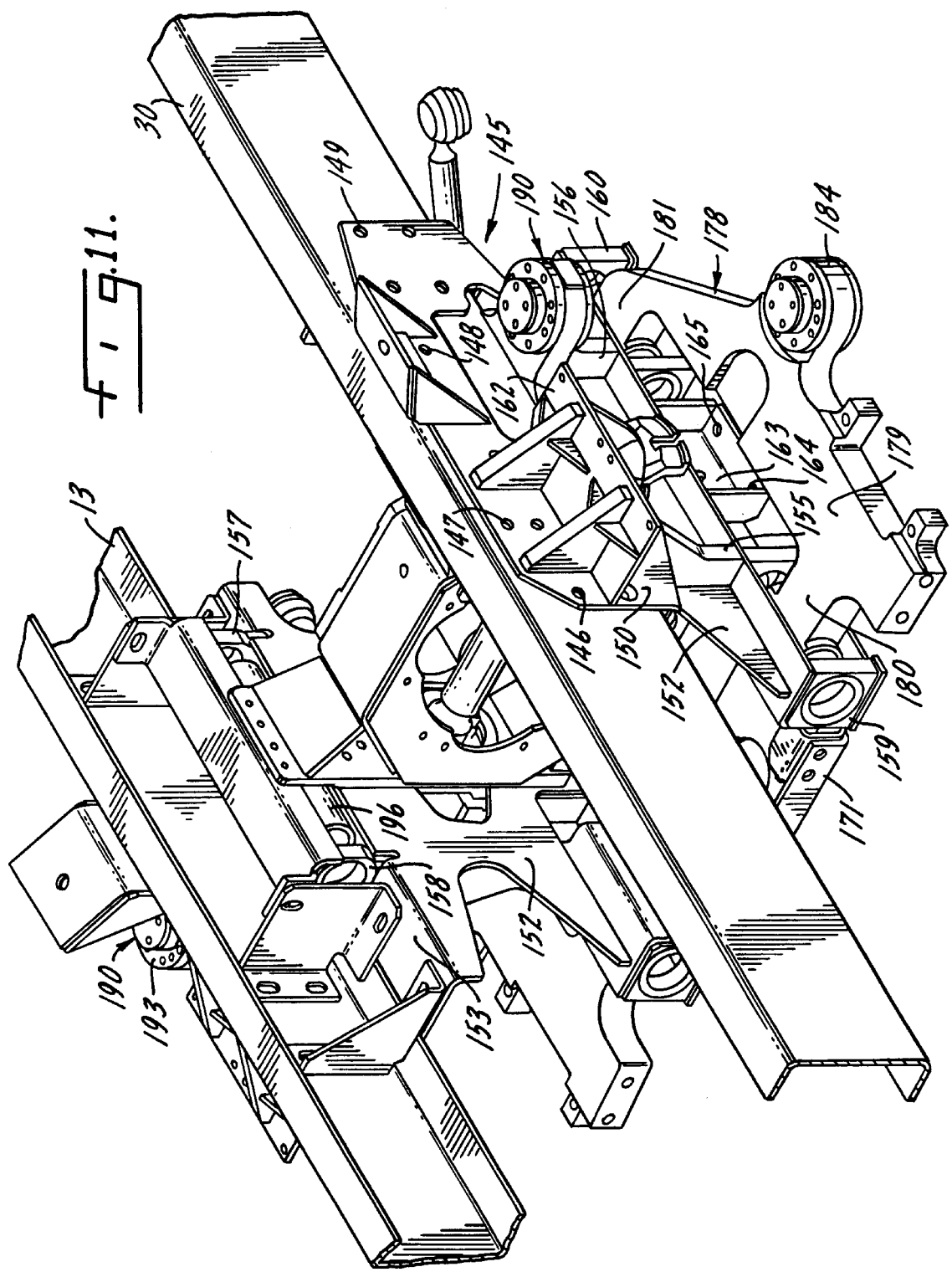

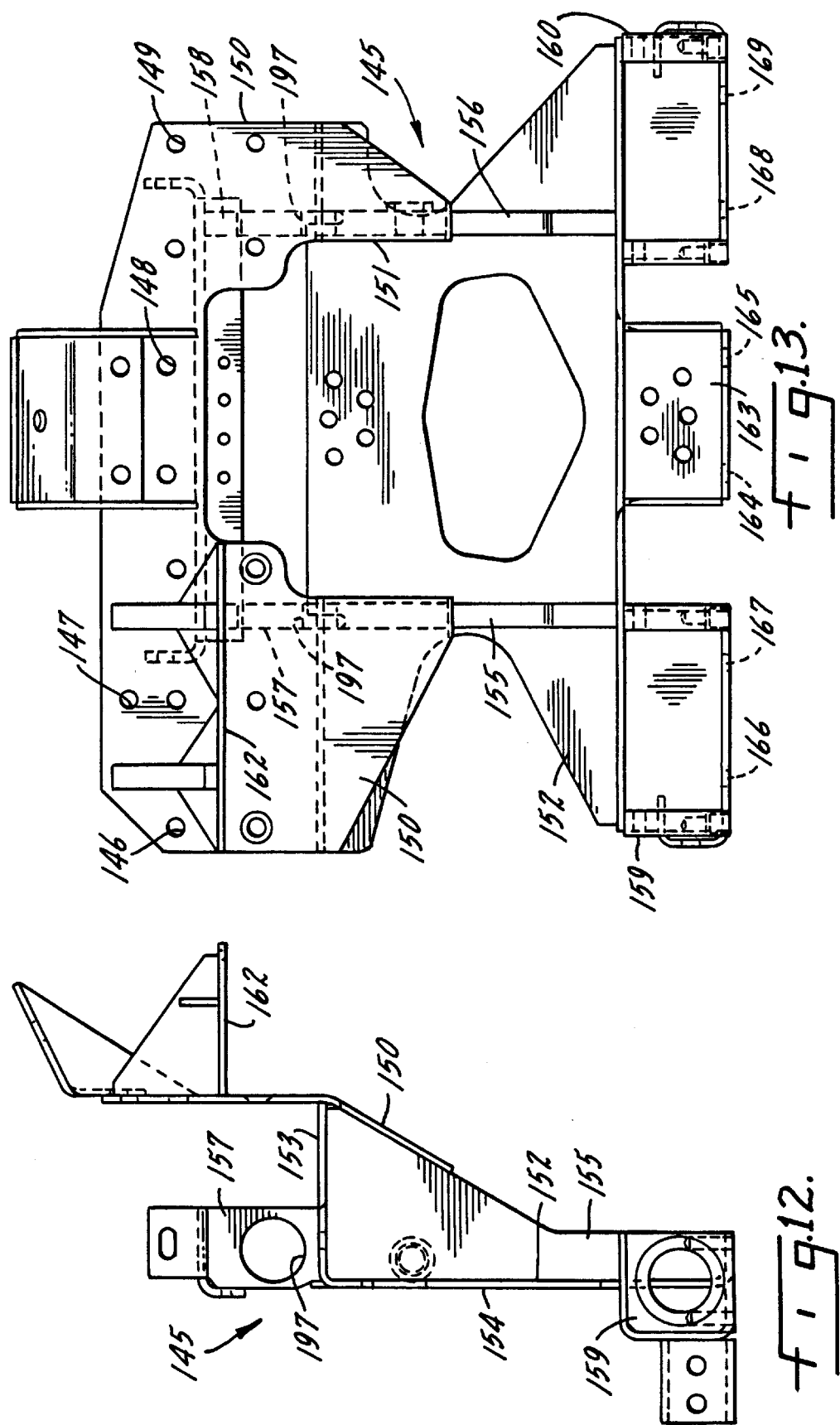

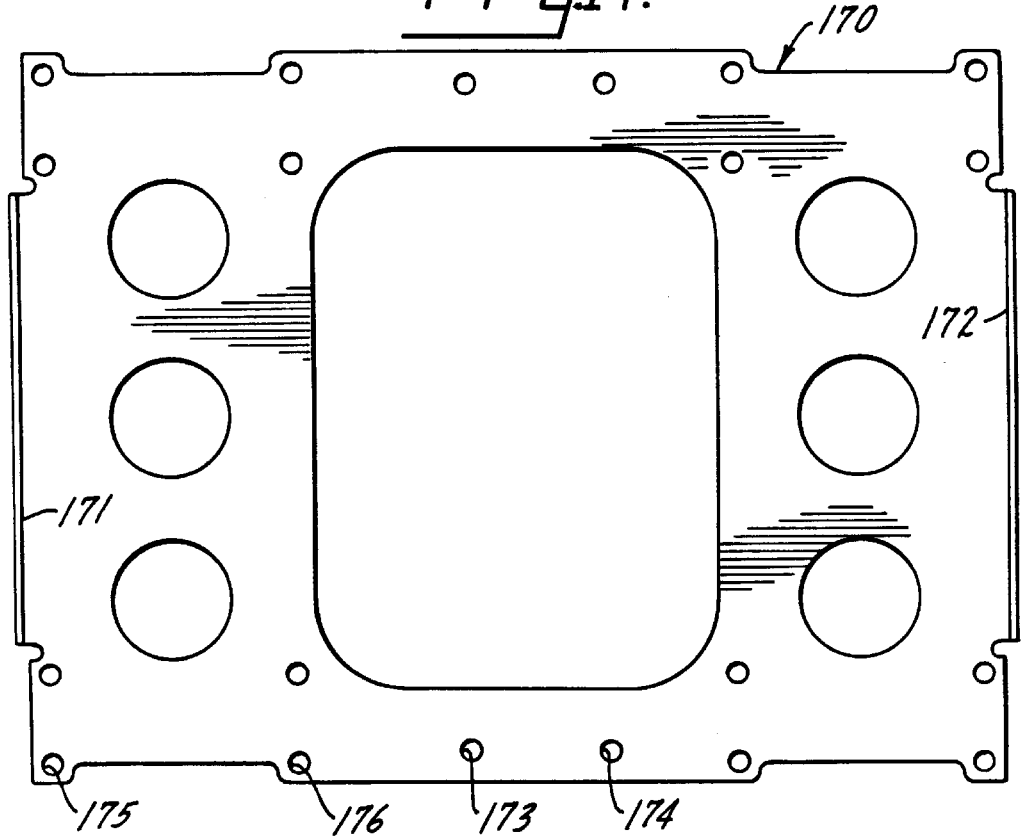
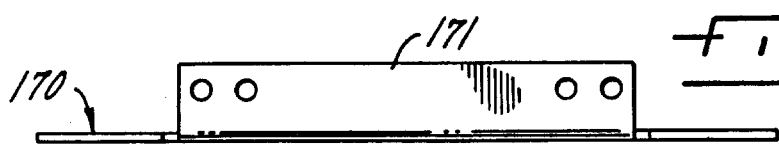
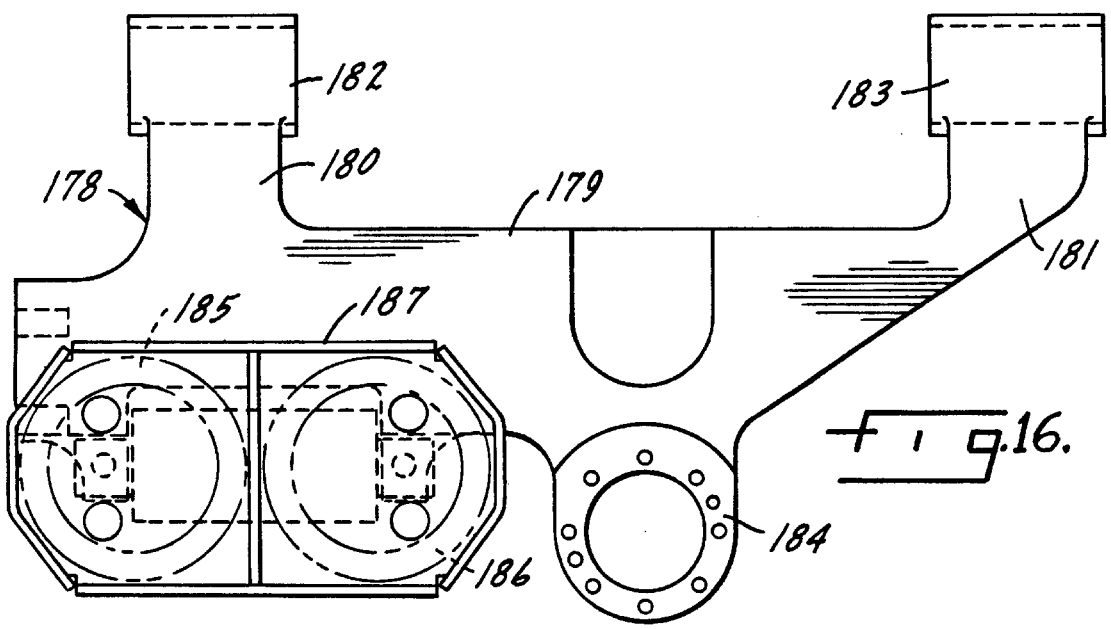

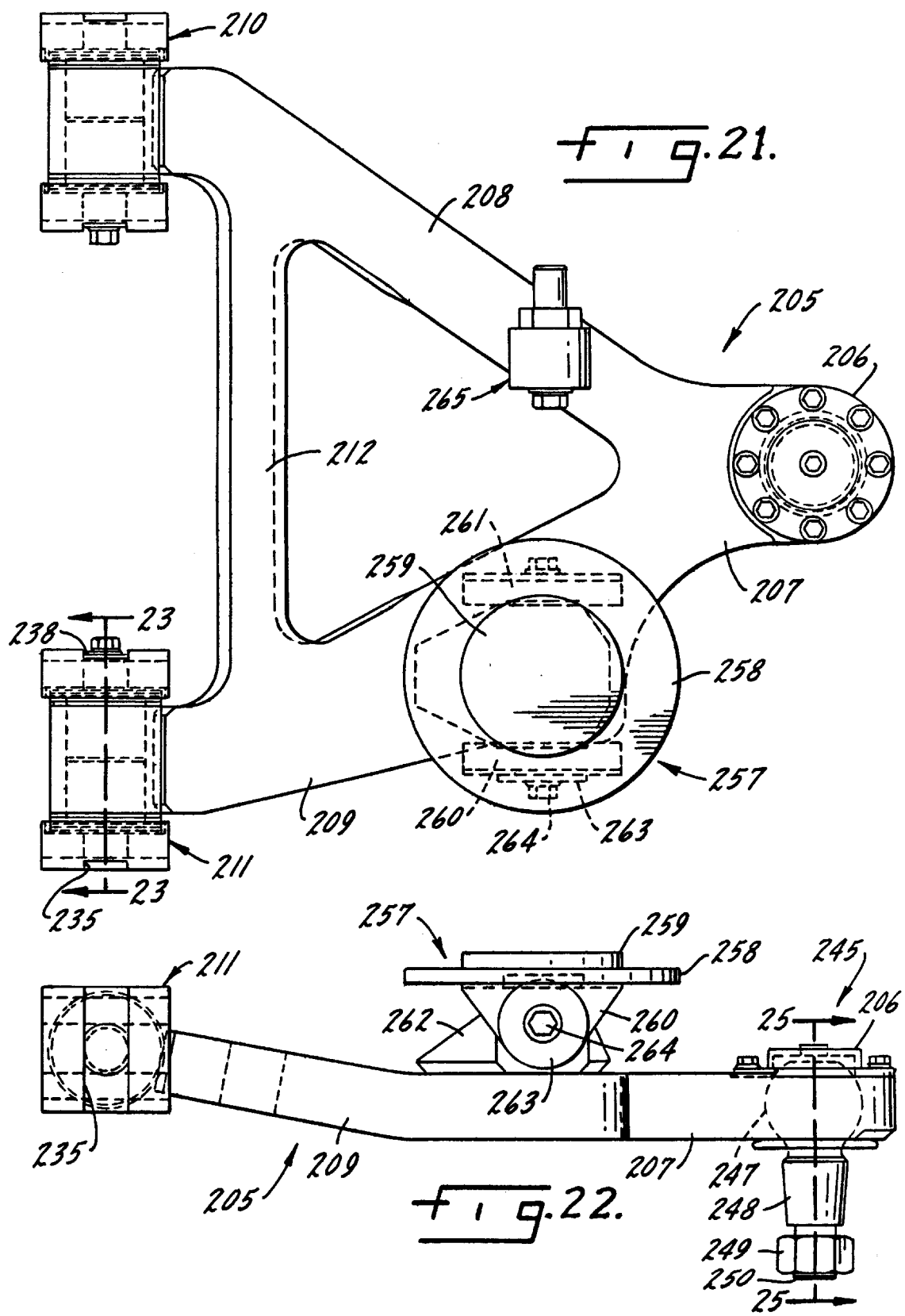

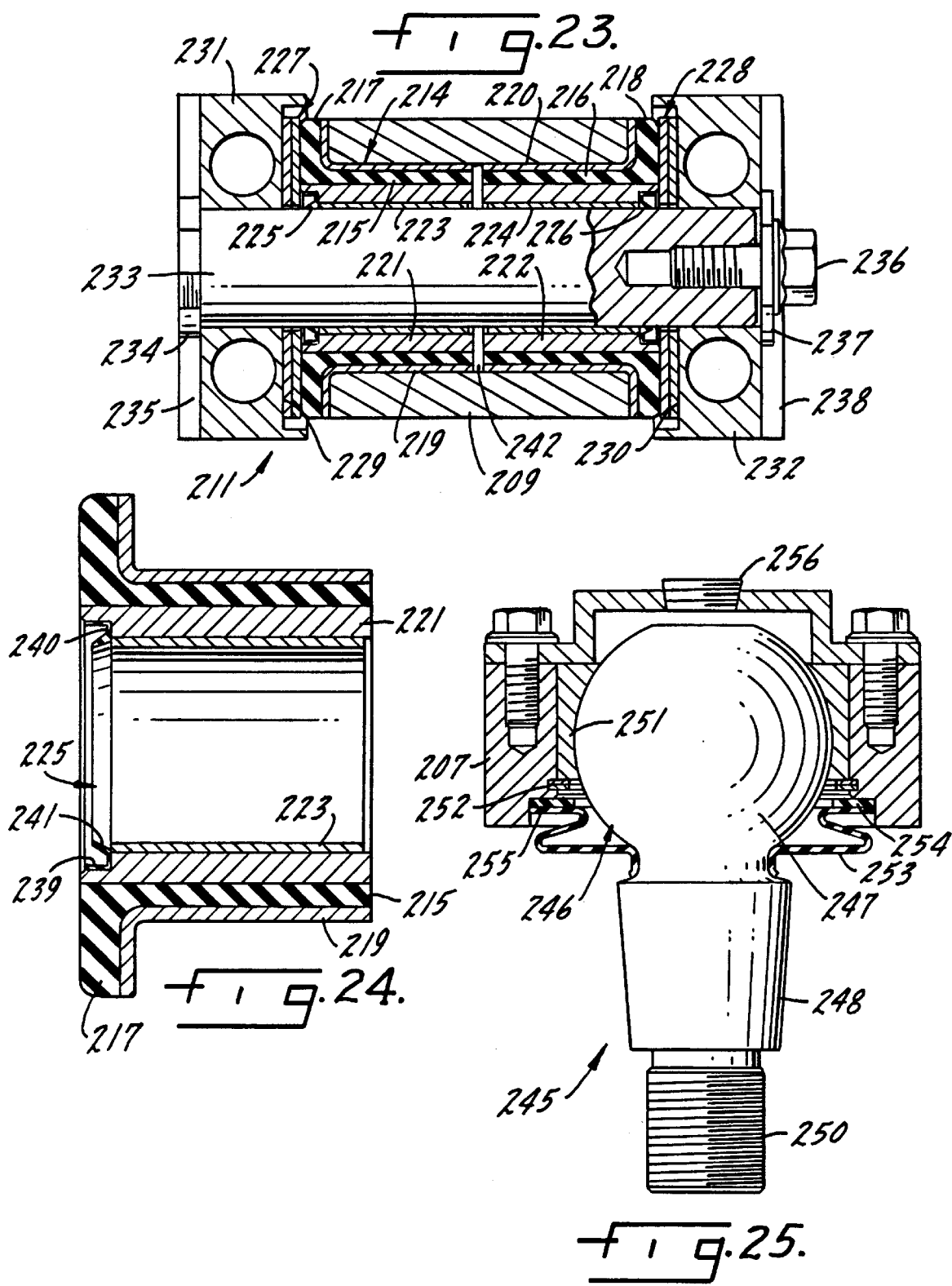

INDEPENDENT SUSPENSIONS FOR LOWERING HEIGHT OF VEHICLE FRAME

This is a continuation-in-part of application Ser. No. 08/421,995, filed Apr. 14, 1995, U.S. Pat. No. 5,538,274, which is a continuation of application Ser. No. 08/046,623, filed Apr. 14, 1993, abandoned.

This invention relates generally to independent suspensions particularly useful in both on-highway and off-highway applications, and specifically to an independent suspension which is modular, in that it can be used in steering or non-steering configurations and with both driven and non-driven axles. More specifically, the suspension is characterized by a low spring rate, long wheel travel, high ground clearance in the off-highway embodiment and flexible frame adaptability.

BACKGROUND OF THE INVENTION

In order to appreciate the uniqueness of the instant invention several terms used herein require definition, which definitions are especially relevant to the off-highway embodiment of the invention.

A high speed surface is defined as terrain which has no obstacles with height that exceeds wheel travel.

A low spring rate means that a wheel is allowed to travel or be displaced upwardly to accommodate a sudden change in terrain with minimal change in vertical force. Since the change in vertical force is what causes vertical body motion, a low spring rate suspension system allows a vehicle to travel such terrain with very little input to chassis and driver. A further advantage of a low spring rate is a decrease in the rearward thrust that is generated as the wheel encounters a positive bump. This "give" or "easing" of the rearward thrust not only reduces driver fatigue but it decreases the power necessary to traverse rough terrain. A low spring rate also decreases the forward thrust required to propel a given wheel up the leading edge of a low-speed obstacle, thereby reducing the tractive effort required. Since less traction is required, the modular independent suspension can negotiate low-speed obstacles with steeper leading edges and under more slippery conditions.

Long wheel travel refers to the vertical motion of a wheel during travel and refers specifically to the extension of the extremes of terrains which are classified as "rough", thereby increasing the variety of surfaces which the modular independent suspension can cross at high speeds. An increase in long wheel travel also increases the height of obstacles which can be negotiated with all tires in contact with the ground. Maintenance of tire-ground contact increases mobility and combats vehicle roll-over.

A low-speed surface is terrain made up of obstacles with heights that exceed wheel travel.

High ground clearance refers to the height of an obstacle that can pass between the tires of a given axle.

A flexible frame refers to the basic structural framework of the vehicle and connotes the ability of the frame to torsionally deflect during operation. The existence of a flexible frame, in effect, increases the effective wheel travel while negotiating low-speed obstacles.

The invention will be described initially in connection with off-highway applications.

As the road system deteriorates in most Western nations and as the demand for efficient low cost off-highway vehicles increases, the use of independent suspensions on off-highway vehicles is of greater importance. Although many independent suspension systems have been developed and gone into use, none appear to be entirely satisfactory for a wide range of operating environments. For example, few, if any, independent suspension systems are truly modular in the sense that they can be applied to steerable or non-steerable wheels, and driven or non-driven axles. Further, the current trend is to design stronger and more rigid frame structures to meet increasingly severe operating conditions and, as experience has shown, this is technically questionable in many applications. And in few if any systems is there any significant degree of commonality of components from wheel to wheel. This latter feature is of increasing significance because unique constructions, wheel to wheel, increase initial cost, maintenance costs, inventory stocking, and skill levels required to keep fleets of heavy duty vehicles operating at high efficiency. Further, in many present independent suspensions operator fatigue is a serious concern. In many systems the wheel travel is so low that the operator is constantly applying and releasing the throttle and yet, even with frequent speed changes, the vertical forces imparted to the operator's cab should be frequent during an eight-hour shift.

With respect to on-highway applications several of the above described shortcomings are not applicable to the same degree as in off-highway applications. Thus, for example, in an on-highway application the vehicle may not be required to traverse terrain having obstacles of the same magnitude as in off-highway environments. Nevertheless, the shortcomings above described generally hold true to some degree. In addition, in on-highway applications other operating factors exist which must be taken into account if the vehicle is to meet the needs of users today. For example, there is a need in on-highway applications to lower the frame of the vehicle, and thereby increase the cargo carrying capacity, to the maximum extent possible. This is particularly important for handlers of light, relatively low cost products, such as potato chips. It will be understood that the height limitation is fixed, and therefore the only way to increase the load carrying capacity of the vehicle is to lower the frame relative to the wheel assembly.

SUMMARY OF THE INVENTION

The present invention includes a modular independent suspension which can be applied to steering or non-steering configurations for both driven and non-driven axles in both off-highway and on-highway applications. Two such suspension modules, identical except for being the mirror image of the other, create the right and left suspensions for a given axle position.

In addition, the modules make available unusually long wheel travel. This derives, in part, from the use of articulated control arms and a flexible frame. Indeed, whereas one well-known off-highway suspension system has about 14½ inches of wheel travel, the module of the present invention makes available about 18 inches, an increase of approximately 25 percent, and, when coupled with a flexible frame, re-defines the high-speed surface for which the vehicle is adapted up to about 23 inches, approximately a 60 percent increase.

Simultaneously with the above-described long wheel travel the modular independent suspension of this invention provides a low spring rate which accommodates sudden changes in terrain with minimal change in vertical force resulting in less impact to the chassis and the driver, a decrease in rearward thrust as the wheels encounter a positive bump, a decrease in the traction effort required and an increase in the ability to negotiate low-speed obstacles with steeper leading edges and under more slippery conditions more efficiently, all as contrasted to current commercial designs.

A suspension module consists of an upper and lower suspension arm, a wheel carrier/steering knuckle and steering arm assembly, sealed upper and lower ball joints, a tie rod, and a coil spring assembly. If desired, one or more of an auxiliary shock absorber, an anti-sway bar, a bump stop assembly (which functions as a supplemental spring) and a rebound stop assembly may be optionally, but preferably, employed.

Other features will be obvious from the following description of a specific embodiment.

BRIEF DESCRIPTION OF THE DRAWING

The invention is illustrated more or less diagrammatically in the accompanying drawing in which:

FIG. 6 is a section through one of the four inboard control arm pivots of the off-highway suspension illustrating particularly the sliding bearing which joins the control arms to the control arm mounting assembly;

FIG. 7 is a section through the unique lower steering knuckle ball joint at the outer end of a lower control arm;

FIG. 8 is a rear elevation of an alternative embodiment of the modular independent suspension assembly of this invention on level terrain which, though adaptable to both off-highway and on-highway applications, is particularly suitable for on-highway applications;

FIG. 9 is a rear elevation of the alternative embodiment showing the suspension in the configuration it assumes in a condition of maximum, or near maximum, jounce;

FIG. 11 is a perspective view of the center section and control arms of the alternative embodiment;

FIG. 12 is an end elevation of the side plate sub-assembly of the alternative embodiment which joins the control arms, and hence the wheel assembly, to the chassis frame;

FIG. 13 is an outside view of the side plate sub-assembly of FIG. 12;

FIG. 14 is a plan view of the connector which joins the two side plate sub-assemblies of an axle system;

FIG. 15 is an end elevation of the connector of FIG. 14;

FIG. 16 is a plan view of the lower control arm of the alternative embodiment;

FIG. 21 is a plan view of a single spring iteration of a lower control arm of the alternative embodiment;

FIG. 22 is a left side view of the lower control arm of FIG. 21;

FIG. 23 is a section through a pivot assembly taken substantially along the line 23—23 of FIG. 21;

FIG. 24 is a view, to an enlarged scale, of the bushing component of the pivot assembly of FIG. 23; and FIG. 25 is a section through a ball joint taken substantially along the line 25—25 of FIG. 22.

DESCRIPTION OF A SPECIFIC EMBODIMENT

Figure 1:
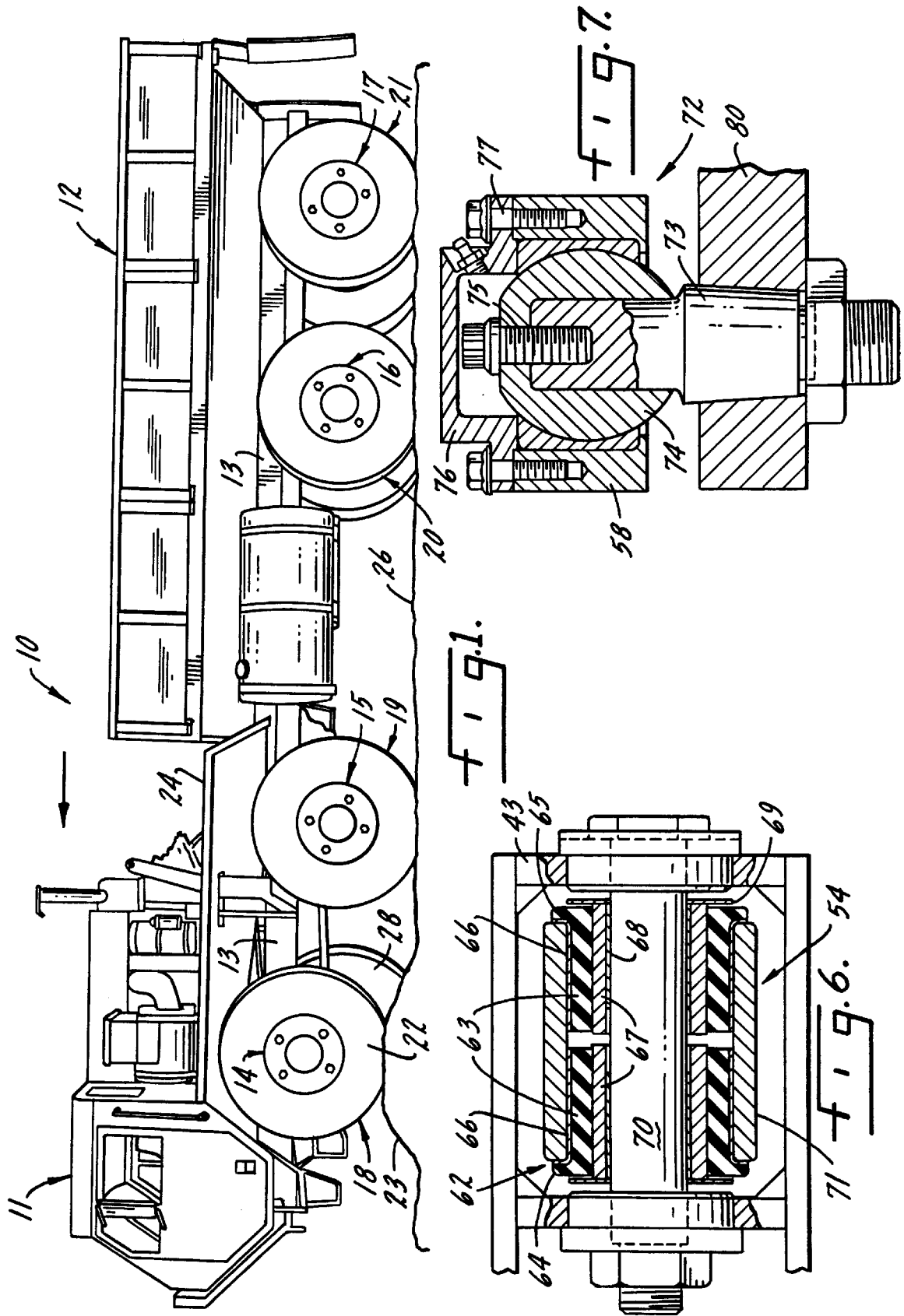
FIG. 1 is a side perspective of an off-highway vehicle having the modular independent suspension of this invention and illustrating the traverse of an obstacle by one wheel of a four-axle vehicle.

Like reference numerals will be used to refer to like or similar parts from Figure to Figure in the following detailed description of the drawing.

An off-highway vehicle is indicated generally at 10 in FIG. 1, the vehicle being, in this instance, a hauler having a cab, indicated generally at 11, and a bin, indicated generally at 12. The cab and bin are mounted on a flexible frame of which the left longitudinal main frame member is indicated at 13. The vehicle has, in this instance, four axles indicated generally at 14, 15, 16 and 17, each having mounted thereon, in this instance, a single tire wheel assembly 18, 19, 20 and 21 respectively on the left side of the frame. The frame is a flexible frame in the sense that the cab and bin are separate structures and can move with respect to one another during travel as a result of the application of torsional forces to the frame. Although a hauler has been illustrated, it will be understood that the invention is applicable to any off-highway vehicle, such as construction equipment, and, also, military vehicles such as tank haulers.

In FIG. 1 the hauler is shown moving to the left in the direction of the arrow. The left front tire 22 has encountered an obstacle 23 in its path of travel and consequently the entire wheel assembly 18 has been elevated until the top of the tire is only a few inches below the overlying platform 24 on which the engine is mounted. Yet, at the same instant, left second axle wheel assembly 19 has remained on the level terrain 26, as have the third and fourth wheel assemblies 20 and 21. It should be particularly noted that the driver's cab 11 has been displaced upwardly very little, if at all, from its normal level terrain position even though left tire assembly 18 has been displaced upwardly at least about 1½ feet. The independent suspension aspect of the front axle assembly can be further appreciated from the fact that the right front tire 28 remains on level terrain even though left front wheel assembly 18 is elevated.

Figure 2:
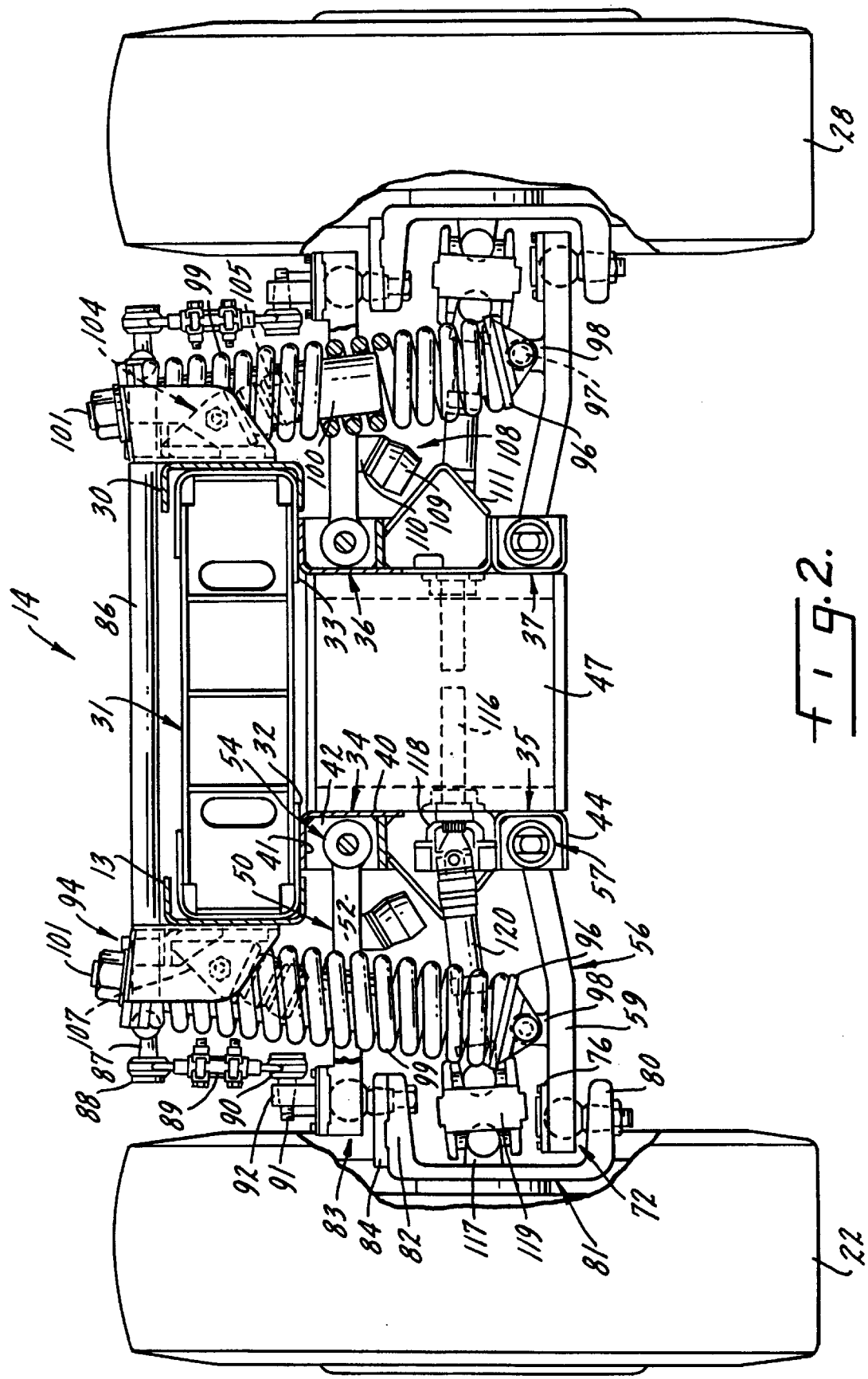
FIG. 2 is a rear elevation of the off-highway modular independent suspension of this invention with parts broken away and others omitted for clarity.

FIG. 2 illustrates any one of axles 14–17 on a level plane. For convenience, it will be understood that axle 14, which includes left and right front tires 22 and 28, is shown.

The main frame members are indicated at 13 and 30. A cross member assembly is indicated generally at 31, the construction of the cross member not being especially critical so long as it includes means, here inwardly directed flanges 32, 33, which provide a base for securement of the independent suspension assembly to the frame.

The independent suspension assembly includes a left upper control arm mounting assembly 34, a left lower control arm mounting assembly 35, a right upper control arm mounting assembly 36 and a right lower control arm mounting assembly 37. Since the arrangement of the control arm mounting assemblies is identical except being mirror images of one another from side to side on the chassis, only the left one will be described.

Figure 5:
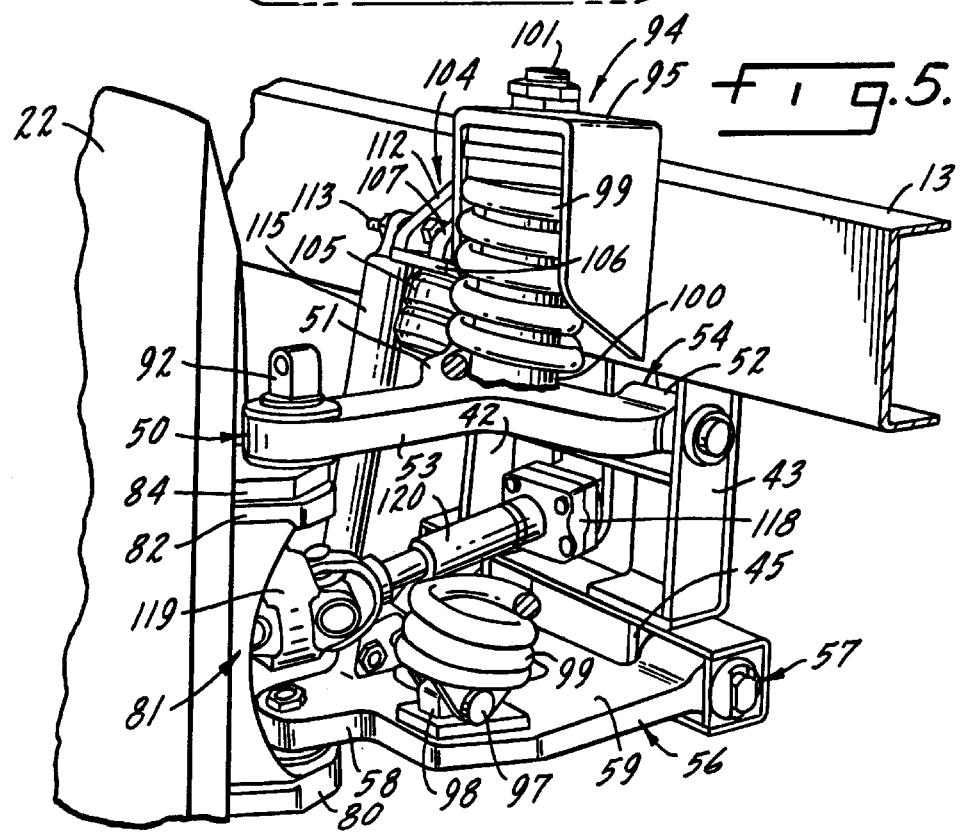
FIG. 5 is a perspective view of the off-highway modular independent suspension assembly of this invention with parts broken away and others omitted for clarity, the wheel assembly being in a steering mode.

Left control arm mounting assembly 34 includes a frame which comprises an L-shaped bracket 40 whose upper arm 41 is secured to flange 32 of the cross member 31. A pair of vertical braces, one of which is illustrated at 42 and another of which is illustrated at 43 in FIG. 5, provide anchor plates for the removable components of the upper control arm assembly to be described. In similar fashion, a lower bracket 44 is rigidly spaced below the upper bracket 40, and one of several vertical braces is indicated at 45, the latter braces providing anchor posts for the lower control arm mounting assembly 35. The left and right control arm mounting assemblies are thus integral with the cross member 31 and thus the frame members 13 and 30.

A differential assembly is indicated at 47, the differential assembly being secured to the left and right control arm mounting assemblies, but not to the cross member 31. Thus, in order to repair or replace the differential assembly it is only necessary to release the securement means holding the differential assembly to the control arm mounting assemblies and the differential assembly may be dropped downwardly therefrom.

The left upper control arm, indicated generally at 50, is illustrated best in FIGS. 2 and 5. It is generally Y-shaped and includes front arm 51, see FIG. 5, rear arm 52, and stem 53. Each of arms 51 and 52 terminates in a control arm pivot indicated generally at 54, see also FIG. 6, which receives a bushing assembly, described hereinafter. The outer end of stem 53 receives a unique two-piece ball joint to be described hereinafter.

Left lower control arm 56 is articulated, as best seen in FIG. 2, and also terminates at its inner end in a pair of control arm pivots, the rearward one of which is indicated generally at 57. The outer end of control arm 56 terminates in a projection 58 which is connected to a ball joint. A wide plate area is indicated at 59, see FIG. 5, between the projection 58 and the control arm pivot assemblies on the inner ends of the control arm.

The construction of the control arm pivots can be best visualized from FIGS. 5 and 6 which illustrate that each of the upper and lower control arms is secured to the chassis by means of two co-linear pivot pins that allow the control arm assemblies 50, 56 to move in generally vertical directions. Bushings isolate the pins from the arms thus allowing conformation to road shocks and enabling the system to absorb high-frequency road inputs.

The control arm pivot 54 includes a bushing 62, see FIG. 6, which consists of a pair of aligned hollow rubber cylinders 63 having end flanges 64, 65 respectively. A metal sleeve is received in the depression formed in the outer circumference of each of cylinders 63, the rubber cylinders 63 being bonded to the metal sleeve 66 so that metal-to-metal contact occurs between the bushing socket 71 and the exterior surface of the bushing. A cylindrical steel sleeve 67 is bonded concentrically to the inside surface of each of rubber cylinders 63. A thin walled cylindrical liner 68 is inserted into the open end of each of the inner steel sleeves 67. A thrust washer assembly is indicated generally at 69 at each end of the bushing assembly. Preferably the thrust washer assembly includes (a) a plastic ring which contacts the outer ends of the cylindrical steel sleeves 67 and the rubber cylinders 63, and (b) a stainless steel washer. Preferably the thrust washer assembly, and specifically the plastic ring, is made from a synthetic lubricant impregnated material. The cylindrical portion of the liner formed by steel sleeves 67 provides an anti-friction medium between the bushing's inner diameter and the steel pin 70 that locates the bushing to the chassis. The thrust washer assembly provides an anti-friction medium between the bushing and the means on the chassis that encapsulates it, thereby preventing fore and aft motion. A means for lubricant to be injected into the inner diameter of the bushing can be incorporated to prolong the life of the anti-friction feature.

Fore-aft tolerance of the control arms along the pivot pins is adjusted by U-shaped shims inserted fore and/or aft of the bushing at each pivot point as needed in the space provided. The retaining feature of the shims requires them to be used in pairs at a given point. After the shim pair is installed they are rotated in opposite directions until holes, pre-made in the base of the U of each shim, line up. Fasteners are then installed through the holes and tightened preventing the shims from rotating relative to each other. In this position the legs of the shim's U cross those of the other, retaining them jointly around the pin.

Figure 3:
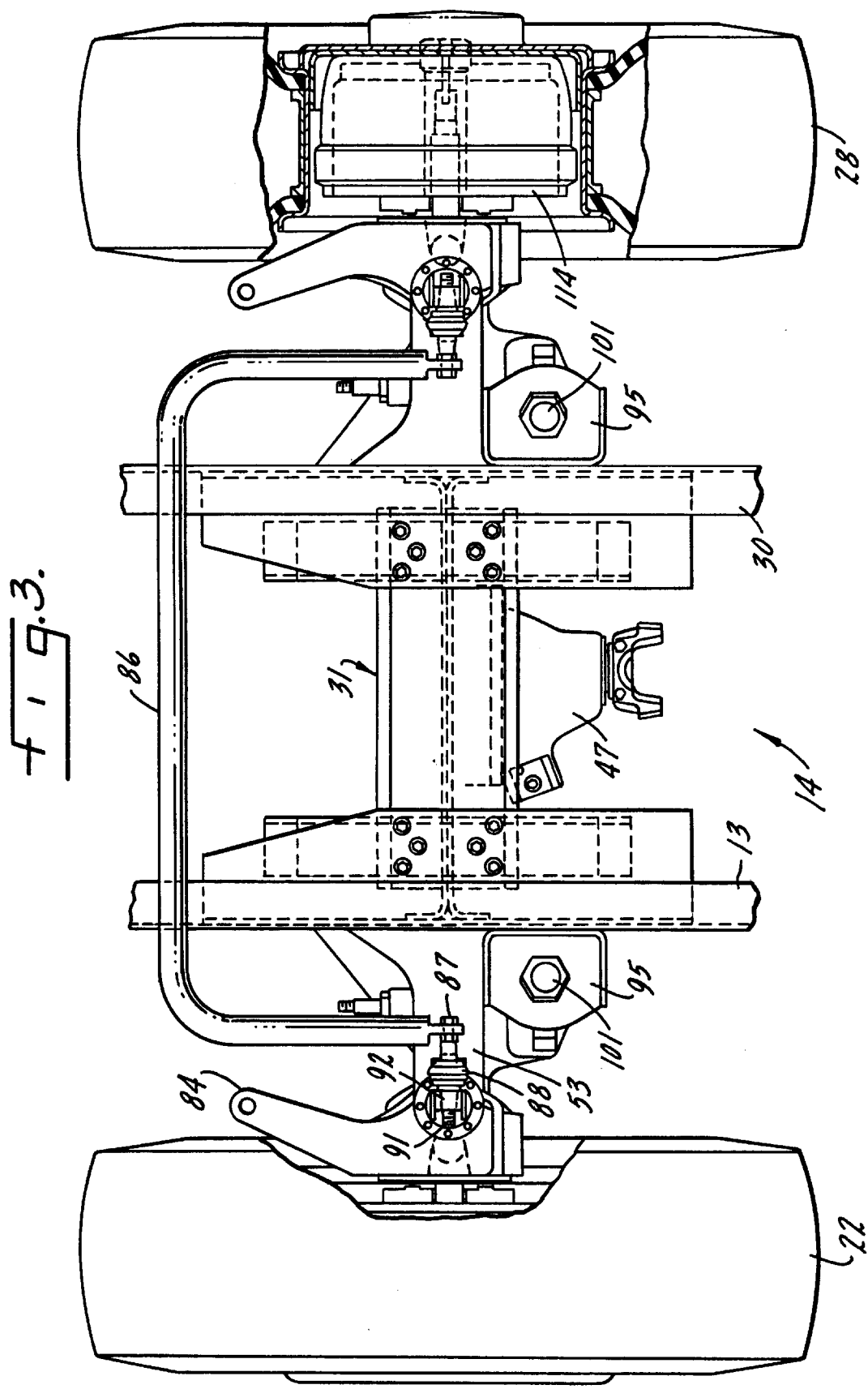
FIG. 3 is a top plan view with parts broken away and others omitted for clarity.
Figure 4:
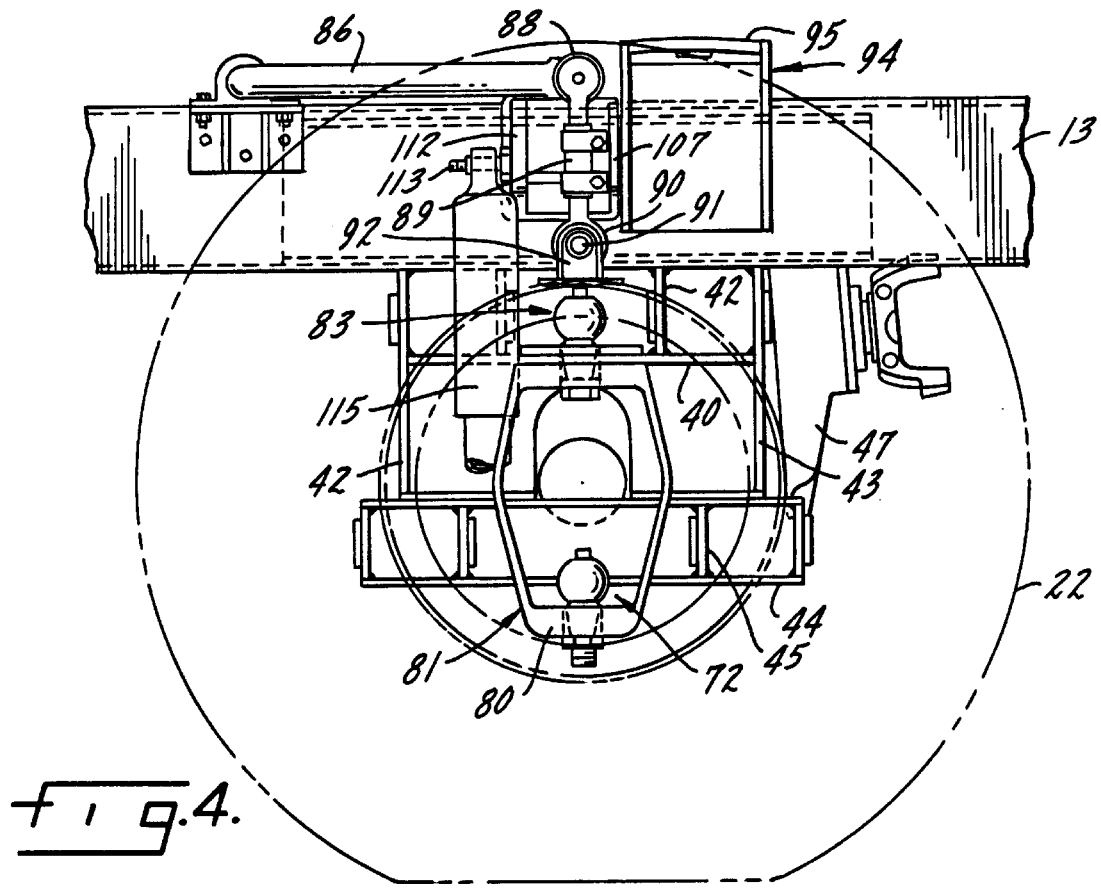
FIG. 4 is a side elevation of the off-highway modular independent suspension assembly of this invention with parts broken away, others omitted, and a wheel assembly shown in phantom.

The outer ends of the control arms 50, 56 are secured to a unique universal joint assembly of which lower ball joint 72 will be described as shown in FIGS. 4, 5 and 7. The ball joint consists essentially of only two pieces, a tapered stud 73, and spherical bearing 74. Retention of the stud in the bearing is accomplished by retaining bolt 75. The purpose in doing this is to make removal of the wheel end simple. By removing the retaining bolt 75 the wheel end can be separated from the suspension control arms without removal of the bearing from the control arm or tapered stud from the steering knuckle. The spherical bearing is retained in projection 58 by housing 76 and cap screws 77. The tapered stud 73 is retained in the lower arm 80 of a steering knuckle indicated generally at 81. The steering knuckle has an upper arm 82 which receives the tapered stud of an upper ball joint assembly 83. In this instance a steering arm 84, see also FIG. 3, is clamped to the upper surface of upper arm 82 by the tapered stud, the upper arm 82 and the steering arm 84 being proportioned so that the ball joint assembly, including the tapered studs, is interchangeable from the upper to the lower steering knuckle arms.

A sway bar is indicated at 86 in FIGS. 2, 3 and 4, the left end of sway bar 86 being pivotally connected to a shaft 87 whose outer end is received in the upper socket 88 of an extensible and retractable link 89, see FIG. 4, whose bottom socket 90, FIG. 4, is pivotally connected by pin 91 to anchor stud 92 located at the outer end of stem 53 of the left upper control arm 50, see particularly FIG. 5.

The spring system for the modular independent suspension is illustrated best in FIGS. 2 and 5 and, to a lesser extent, in FIGS. 3 and 4. An upper spring retaining bracket is indicated generally at 94, the bracket being, in effect, a four-sided housing open at the bottom and outside, and being welded or otherwise suitably secured to the outside of left main frame member 13. In this instance the top wall 95, FIG. 3, is located several inches above main frame 13, see FIGS. 4 and 5. A rocker plate 96, see FIG. 2, is pivotally secured to a pivot pin 97, see FIGS. 2 and 5, received in stud 98 which is fast with left lower control arm 56. A long coil spring having a low spring rate is indicated at 99, the lowest coil of the spring being secured to rocker plate 96 and the upper coil being secured to top plate 95. Due to the long wheel travel of the independent suspension system, the coil spring 99 must be very long and, as seen in the Figures, a coil spring of such greater than normal length is illustrated. The long coil spring, in combination with the necessary small coil diameter, could lead to instability of the spring. As a consequence, a spring guide assembly is provided, the guide assembly comprising a tube or bar 100 which extends downwardly from the top plate 95 and is secured to the top plate 95 by bolt 101. By protruding into the top end of the spring, the length of the coil which is capable of buckling is reduced. This reduces the length-to-width ratio of the coil to a stable configuration.

Preferably the spring guide extension is made from a synthetic, low friction abrasion resistant material. The spring guide assembly stabilizes the inside diameter of the coil without wear, generation of heat/damping, or other adverse effects.

A bump-stop feature is indicated generally at 104 in FIGS. 2 and 5. The bump stop may consist of a rubber cushion 105 which is mounted to a base plate 106 which in turn is secured to one of two triangular struts 107, 112, which in turn are welded or otherwise suitably secured to the main frame members 13 or 30. As best seen in FIG. 5 the bumpstop is positioned to engage the upper control arm 50 early in the upward travel of control arm 50. In addition to serving as a cushioned suspension stop the cushion 105 also acts as a helper spring, augmenting the load carrying capacity of the coil spring 99.

A rebound stop assembly is indicated generally at 108 in FIG. 2. It will be understood that proper design of a coil spring suspension requires that the installed coil never be allowed to extend to a length that would remove its compressive force. When in full, unrestrained rebound, such a suspension would have loose springs which produce a rattle and there would be the danger of the spring slipping out of its installation. Such a result is precluded by the rebound stop assembly 108 which consists of, preferably, a very hard, yet compressible, plastic doughnut or puck-like member 109 which is mounted by support plate 110 to the underside of control arm 50. A stop plate is indicated at 111, the stop plate being aligned with the arc of movement of rebound member 109. In this instance the stop plate is shown as welded or otherwise suitably secured to its associated control arm assembly. By proper placement and positioning of the rebound stop member 109 and the stop plate 111, the extension of coil spring 99 can be controlled during rebound to preclude the coil spring from extending to a length at which its compressive force is neutral, or negative.

As is well known, coil spring suspensions are designed to include a spring preload which requires that the free length of the spring be greater than the room allowed for it in an assembled condition. Conventionally, in such a suspension, a spring compressor is required for assembly. However, compressing the springs for a heavy duty suspension such as that here illustrated is a difficult and dangerous procedure.

Such difficulty and danger is eliminated in the instant system by merely removing the rebound limiter 109. Thereafter a free coil spring may be installed in the suspension, and a floor jack or even the weight of the vehicle used to compress the coil spring enough to install the rebound limiter 109.

Referring now to FIG. 3, it will be noted that drum brakes 114 have been illustrated in the wheel assembly. This is important in that this is the major contributor to the modular independent suspension assembly's narrow width. Given the width of the differential housing, the length of the control arm required for long wheel travel, and the width of a wheel rim and hub, the brake assembly must be a structure which "shares" suspension width with other components, as opposed to adding overall width to the suspension. Drum brakes accomplish this by sharing width with the hub assembly, fitting around it without adding width to it. Further, preferably the drum brake is located around a planetary gear set within the wheel.

Many advantages of the disclosed modular independent suspension will be immediately apparent from the foregoing description. Several of these advantages are especially noteworthy as follows:

If the suspension is employed in a steering axle configuration, the steering arm of the steering knuckle is linked to the steering gear via a tie rod which allows the steering knuckle to be rotated about its ball joints to steer the vehicle.

If the suspension is used in a non-steering axle configuration, the tie rod serves to link the steering arm knuckle to the chassis, thereby maintaining the knuckle in a generally straight-ahead direction. The geometry of the tie rod's attachment points, in both steering and non-steering axles, is such that suspension travel does not generate undesirable steering effects.

Various weight carrying capacities, ride, heights, and deflecting rates can be accommodated by installing coil springs of the appropriate length and stiffness, and by positioning the coil spring assembly's mounting point on the chassis accordingly. If desired, a shock absorber 115 with necessary dimensions and desired damping characteristics can be provided. In this instance, the upper end of shock absorber 115 is pivotally connected to triangular strut 112 by a pivot pin 113, see FIG. 5, and the lower end is pivotally connected to the wide plate area 59 on the lower control arm.

Referring now to FIGS. 2 and 5, and assuming that the suspension is used in a drive axle configuration, halfshaft 120 connects the output 116 of the differential to the input 117 of the axle shaft in the wheel carrier. The half shaft is connected to the output 116 of the differential via a Cardon type universal joint 118. The halfshaft 120 is then connected to the axle shaft in the wheelend carrier by a double-Cardon joint 119. In the case of nonsteering configuration, the double-Cardon could be replaced by a single-Cardon joint.

As consequence, removal of the halfshaft 120 for maintenance and/or replacement can be easily accomplished without disassembly of the suspension. This is done by removing the shaft retaining bolt in the wheel carrier and the four bolts which mount the single Cardon to the differential output yoke. The shaft is then removed by pulling it out from the suspension, slipper yoke end first.

Wheel carrier gearing can be used to reduce the torque transmitted by the halfshaft when direct drive is not appropriate.

By the same token, the modular independent suspension permits replacement of the differential without disassembly of wheelends or suspension linkages. This is primarily a result of the control arm bracketry which attaches to the chassis crossmembers as well as the differential housing.

An alternative embodiment, and variations thereof, is illustrated in FIGS. 8–25. Said alternative embodiment, while adaptable for off-highway use, is also well adapted for on-highway use when it is desired that the operational height of the frame be lower relative to the position of the frame shown in the embodiment of FIGS. 1–7. In describing the alternative embodiment indicated at 130 of FIGS. 8–25, like reference numerals will be used to refer to like or similar parts as are found in the embodiment of FIGS. 1–7.

Referring first to FIG. 8, a single tire system is shown, each wheel assembly 131, 132 of which a tire forms a part, being supported by a control arm assembly, the control arm assembly being indicated generally at 133 and 134. Since each wheel assembly, and thus each control arm assembly, is identical, save for being a mirror image of an opposite wheel assembly, only one will be described.

In the FIG. 8 condition the suspension is shown on level terrain 26 in which condition it will be noted that the frame members 13, 30 are positioned a considerable distance below the top of the tires 22, 28 so that the operational height of the frame of this alternative embodiment is lower than the operational height of the frame of the off-highway embodiment of FIGS. 1–7. As a consequence, for a given height of trailer, a greater cubage is provided.

Although the operational height of the frame is lower, reference to FIG. 9 shows that long wheel travel is still available as tire 22 encounters a hump in terrain 135. It will be seen that though tire 22 and its associated wheel assembly are elevated a considerable distance above tire 28 and its associated wheel assembly, good ground contact continues to be made between tire 22 and terrain 135. This feature of maintenance of good ground-tire contact is attributable, in large part, to the unique control arm assemblies 133, 134 to be described hereinafter.

Figure 10:
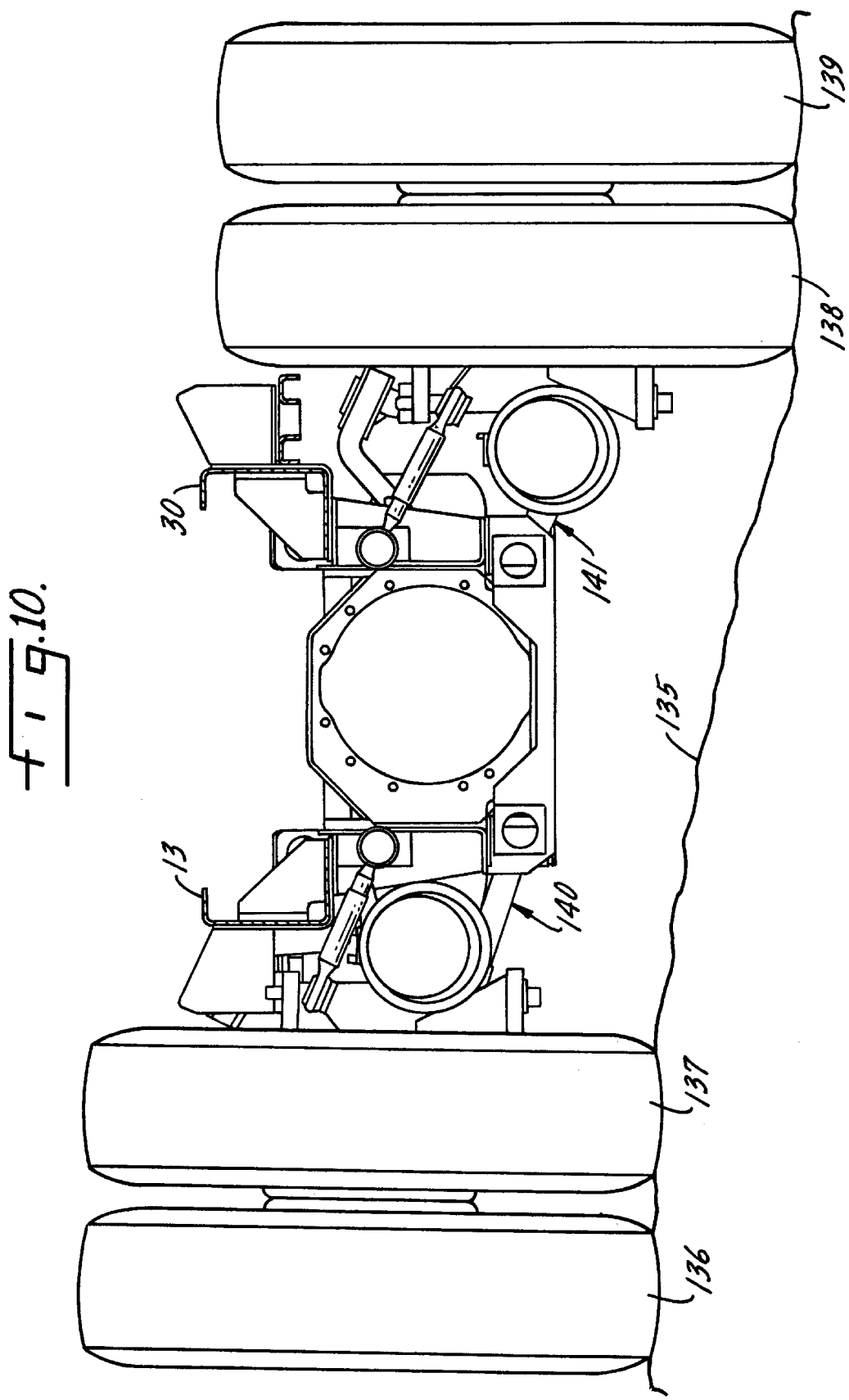
FIG. 10 is a rear elevation of the alternative embodiment of this invention in a dual wheel system showing the suspension in the configuration it assumes in a condition of maximum, or near maximum, jounce.

FIG. 10 illustrates a variation of this alternative embodiment in the form of dual tires 136, 137 and 138, 139, said dual tire system having control arm assemblies 140, 141 respectively in which the geometry of certain components has been slightly altered, primarily the length of the control arms as contrasted to the configuration of said components in the embodiment of FIGS. 8 and 9.

FIG. 11 shows a center section including the control arms, of the independent modular suspension with parts omitted for clarity. A generally hour-glass shaped side plate, indicated generally at 145, see also FIGS. 12 and 13, is secured to frame member 30 by bolt means 146, 147, 148 and 149. The side plate includes an upper, generally inverted U-shaped portion 150 having an opening 151 therein to receive the control arms, and a lower generally hour-glass shaped portion 152 having a flat upper portion 153 and a vertical wall portion 154. The upper and lower portions 150, 152 are secured to one another by a plurality, here two, generally triangular braces 155, 156. As can be best appreciated from FIGS. 11 and 12, the internal web (not shown) of a side frame member 30 is located on the outermost portion of the flat platform 153. Left 157 and right 158 pivot bushing blocks for the upper control arm assembly are welded or otherwise suitably secured to the innermost portion of platform 153. Left 159 and right 160 pivot bushing block assemblies are welded or otherwise suitably secured to the lower edge of the lower portion 152 of side plate 145. A top base plate for, in this instance, a pair of coil springs is indicated at 162, and an anchor plate for a bottom connector is indicated at 163, said anchor plate having bolt apertures 164, 165 therein. Similar bolt apertures are indicated at 166, 167 in left pivot bushing block 159, and at 168, 169 in right pivot bushing block 160.

A rigid bottom connector is indicated at 170 in FIGS. 14 and 15. Said connector 170 has end flanges 171, 172. Bolt holes 173, 174 mate with bolt holes 164, 165, bolt holes 175, 176 mate with bolt holes 166, 167, etc.

A two spring lower control arm is indicated at 178 in FIGS. 11 and 16. The control arm includes a generally Y-shaped body section 179 having two pivot arms 180, 181, which terminate in bushing sockets 182, 183, and a pivot base 184 at the end of the stem of the Y. A compartmented housing for springs 185, 186 is indicated at 187 in FIG. 16.

Figure 17:
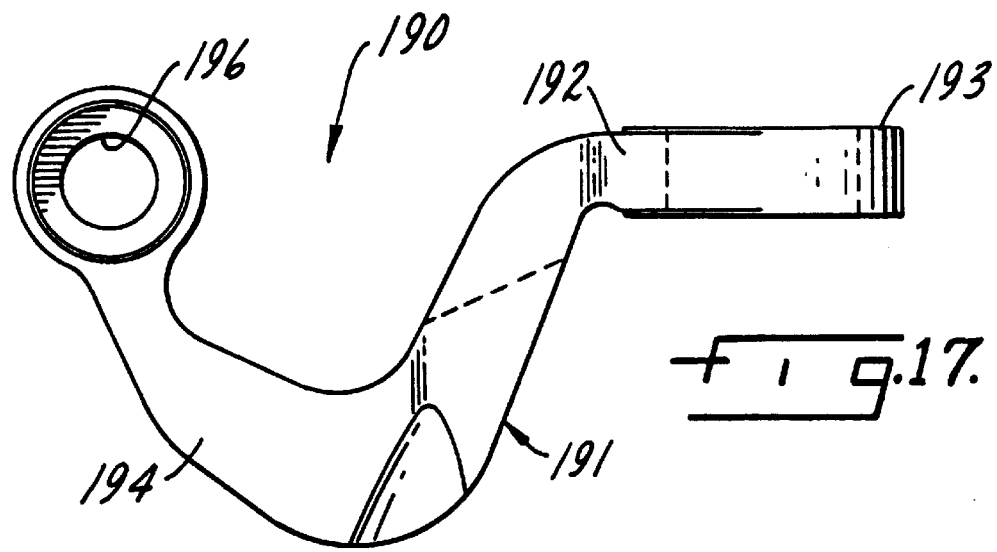
FIG. 17 is an end view of the upper control arm of the alternative embodiment.
Figure 18:
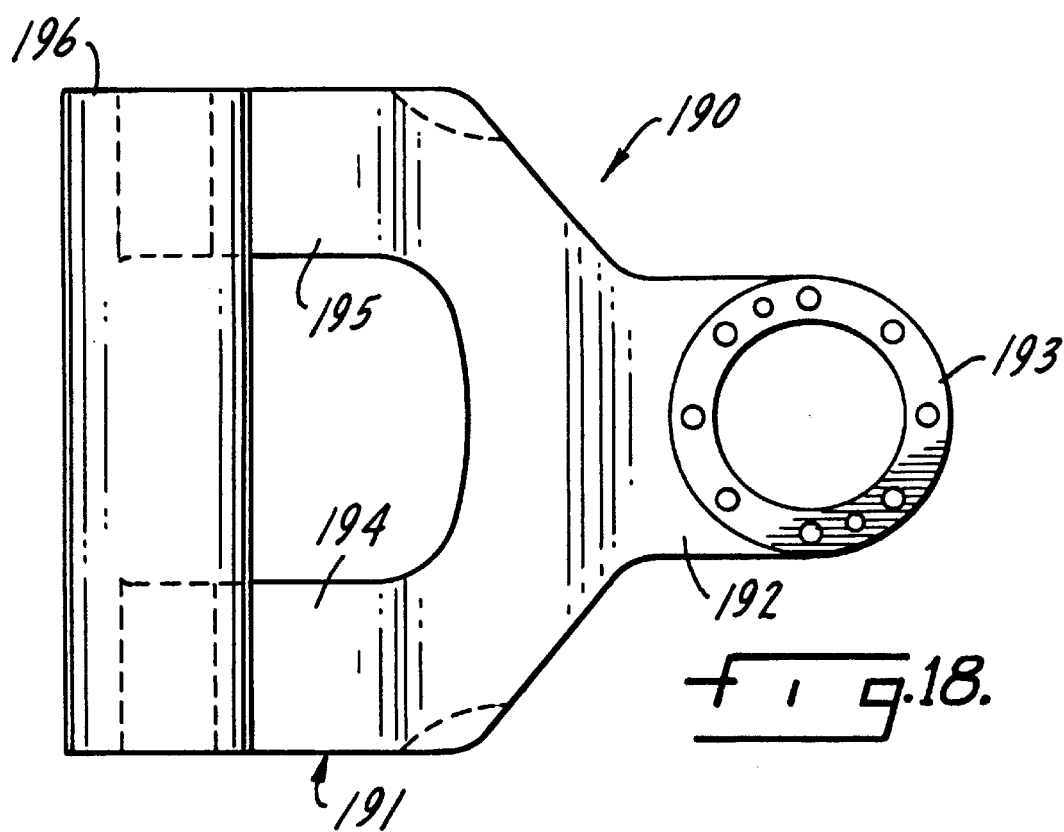
FIG. 18 is a plan view of the upper control arm of the alternative embodiment.

The upper control arm 190, which is key to the lowering of the operational height of the frame, is shown in FIGS. 17 and 18. The upper control arm 190 includes a body section, indicated generally at 191, which, as seen in side elevation in FIG. 17, is generally dipper shaped. The body section includes a stem portion 192 which terminates in a pivot joint base 193. A pair of pivot arms are indicated at 194, 195, the left, or innermost, ends of the pivot arms being integral with an elongated bushing socket 196. The open maw formed by the generally U-shaped configuration of the inner end of stem 192 and the pivot arms 194, 195 enables the bushing socket 196 to be aligned with the holes 197, formed in left 157 and right 158 pivot bushing blocks, see FIGS. 12 and 13, which are placed above the level of the bottom of side frame member 30 and yet permit movement of one control arm in a downward direction, as seen at the right side of FIG. 9, and the other control arm to move in an upward direction as seen at the left side of FIG. 9. It can be seen from FIGS. 12, 13, 17 and 18 that when the cylindrical bushing socket 196 is aligned with the holes 197 formed in left 157 and right 158 pivot bushing blocks, there is defined a pivot axis which is fixed with respect to the frame. Referring to FIGS. 11–13, it can also be seen the inner end of the upper control arm is connected to the bottom, downwardly facing portion of the frame by way of a connection between the left 157 and right 158 pivot bushing blocks and the platform 153 and a connection between the platform 153 and the bottom, downwardly facing portion of the frame. Upon further review of FIG. 9 together with FIG. 17, it can also be appreciated that the dipper shaped areas of the upper control arm 190 allow the independent suspension of this embodiment of the invention to accommodate long wheel travels. Specifically, it can be seen from FIG. 9 that when tire 22 confronts an obstacle, the dipper shaped areas of the upper control arm 190 receive and surround the outermost and lowermost edge of frame member 13 during upward travel of the wheel 22. It can also be seen that upper control arm 190 can accommodate maximum upward wheel travel without interfering with the frame. As will be most easily appreciated from a comparison of the upper control arms in FIGS. 2 and 9, if the upper control arm of the on-highway embodiment of FIG. 9 were substantially linear as is the upper control arm of FIG. 2 in the off-highway embodiment, the very large wheel travel illustrated in FIG. 9 could not be achieved due to interference with the side frame 13.

Figure 20:
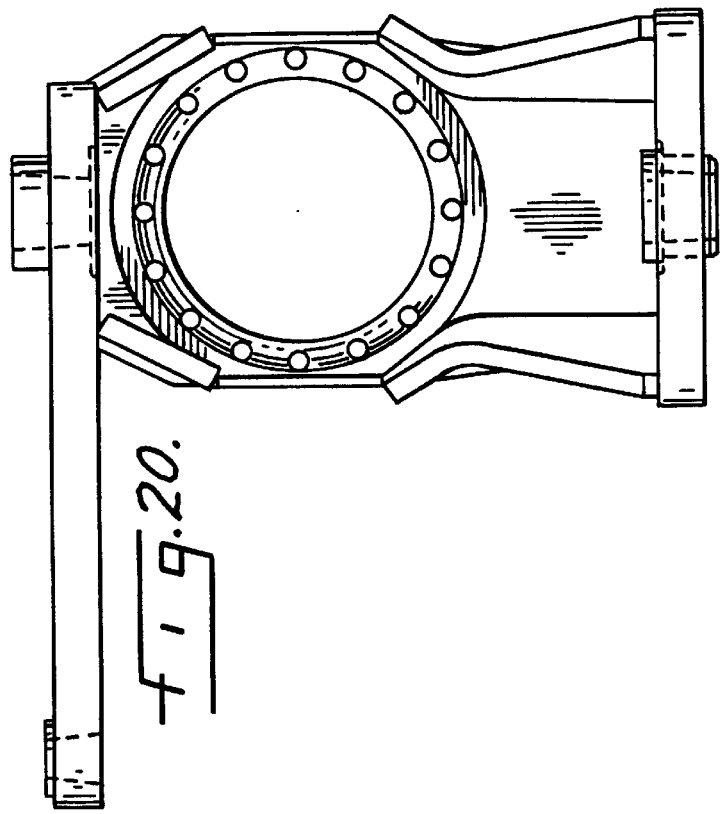
FIG. 20 is an elevation of the knuckle attachment of FIG. 19.
Figure 19:
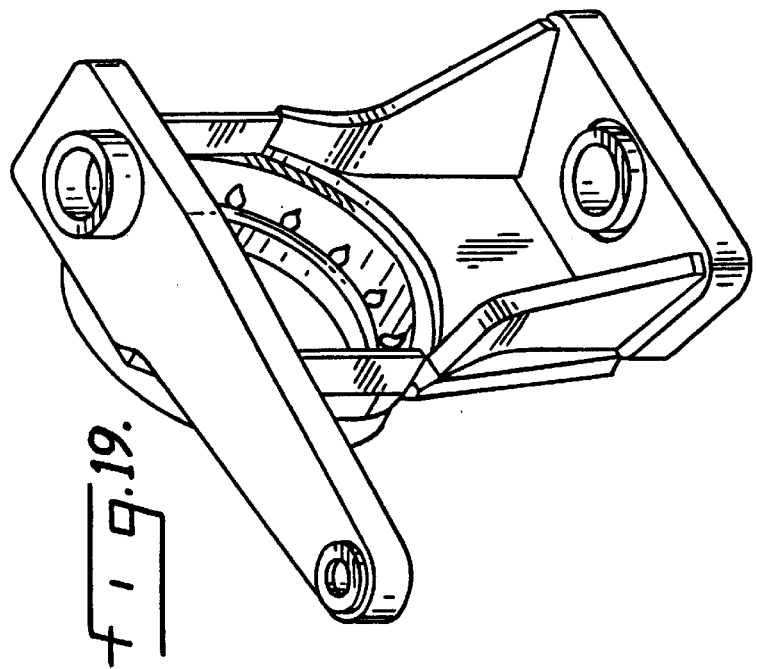
FIG. 19 is a perspective view of the attachment of the knuckle to the control arm.

A steering knuckle assembly is indicated generally at 200 in FIGS. 19 and 20. It will be noted from a comparison from the orientation of the upper control arms in FIGS. 2 and 8 that the axis of the steering knuckle of the FIG. 9 embodiment is located further inboard than is the axis in the FIG. 2 embodiment. As a consequence the steering arm 201 may be linear in the alternative embodiment, thereby providing a greater arc of swing.

A single spring variation of a lower control arm is indicated generally at 205 in FIGS. 21 and 22. Lower control arm 205 is generally Y-shaped and includes a pivot connection 206 at the base of the Y-stem 207, and front and rear arms 208 and 209 which terminate, at their free ends, in pivots indicated generally at 210–211. A stiffener is indicated at 212.

The construction of the control arm pivots 210, 211, can be best visualized from FIGS. 21–24 which illustrate that each of the brace arms 208, 209 is secured to the chassis by means of two co-linear pivot pins that allow the lower control arm assembly 205 to move in generally vertical directions. Bushings isolate the pins from the arms thus allowing conformation to road shocks and enabling the system to absorb high-frequency road inputs.

Control arm pivot 211 includes a bushing, indicated generally at 214 which consists of a pair of aligned hollow rubber cylinders 215, 216, having end flanges 217, 218, respectively. Two metal sleeves 219, 220, are received in the depression formed in the outer circumference of each of the cylinders 215, 216, the rubber cylinders 215, 216 being bonded to their respective metal sleeves 219, 220 so that metal-to-metal contact occurs between the bushing socket and the exterior surfaces of the metal sleeves 219,220. A cylindrical steel sleeve is bonded concentrically to the inside surface of each of the rubber cylinders 215, 216, said cylindrical sleeves being indicated at 221, 222. A thin walled cylinder liner for each half of the bushing is indicated at 223, 224, the cylinder liners terminating short of the outer ends of the cylindrical sleeves 221, 222. As will be noted from FIG. 23, the cylindrical sleeves 221, 222 are notched at their outer ends to provide a seat for cylindrical washers indicated at 225, 226. The outer surfaces of flanges 217, 218, cylindrical steel sleeves 221, 222, and washers 225, 226 are flush with one another. A pair of control arm pivot thrust washers are indicated generally at 227, 228, the outer surface of each pair bearing against a facing bearing thrust surface 229, 230 in end members 231, 232, respectively, of the control arm pivot block 211.

A control arm block pin is indicated at 233, the pin having a head 234 which bears against the edge of left end member 231, the head 234 being received in a recess 235 in the left end of member 231. A screw 236 is threaded into a hole in the pin 233, the screw holding a control arm pivot washer 237 which maintains the parts in assembled relationship. A recess is indicated at 238.

The cylindrical washer 225 is illustrated in greater detail in FIG. 24 from which it will be seen that it consists of an L-shaped ring having outer flange 239 from which radially inwardly extending flange 240 extends, the innermost, circular end of radial flange 240 terminating in a radially inwardly biased flexible wiper flange 241, so that lubricant can be retained at all times around the pin 233 throughout its working length. Since the right end of rubber cylinder 215, sleeve 221 and cylinder liner 223 terminate short of the mid-point of the pin 233, and the right half of the bearing is similarly formed, a lubricant reservoir is formed at 242 from which all metal-to-metal parts may be lubricated.

The outer end 207 of control arm 205 is secured to an alternative form of a universal joint assembly 245 which is best seen in FIGS. 22 and 25. The ball joint assembly consists of a ball joint 246 comprised of a spherical bearing 247 and a tapered stud 248. The tapered stud 248 is received in a complimentarily tapered recess in the wheel assembly, or in a steered wheel, the steering knuckle 200, and a nut 249 received on the lower threaded portion 250 of the stud 248 retains the U-joint assembly 245 to the chassis. A spherical seat is indicated at 251 which is held in place by ring washer 252. A tensioned ball joint boot is indicated at 253, the upper flange of which seats against a flat washer 254 received in a recess 255 in the lower side of stem 207. A lubricant fitting is indicated at 256.

A spring pivot assembly is indicated generally at 257 in FIGS. 21 and 22. The assembly includes a spring seat 258 from which a center ring stud 259 extends upwardly. A pair of generally triangularly shaped pivot flanges are indicated at 260, 261 projecting downwardly from spring seat 258, the pivot flanges being apertured to receive a spring pivot pin, not shown, carried by a pin base 262 mounted on the top of arm 209, the pin preferably having a retaining flange at one end and a spring pivot washer 263 at the other end which is anchored to the pin by bolt 264 which is received in a threaded hole in the center of the pin. A shock mounting stud is indicated generally at 265.

In summary, the modular independent suspension concepts here disclosed constitute a basic design readily adaptable to almost any vehicle configuration. Further, it allows a high degree of parts commonality among steering, non-steering, driven and non-driven axles on a particular vehicle, in both off-highway and on-highway embodiments and minimizes the additional effort required to incorporate additional axles into a base vehicle design.

Although specific and alternative embodiments and variations thereof have been illustrated and described herein, it will be understood that modifications and betterments of the herein disclosed concepts may be made within the skill of the art. Accordingly, it is intended that the scope of the invention be limited solely by the scope of the hereafter appended claims, when interpreted in light of the relevant prior art, and not by the foregoing exemplary description.

We claim:

1. An independent suspension suitable for use in lowering the operational height of a vehicle frame, said suspension including:

an upper control arm having an inner end connected to a downwardly facing portion of said frame and an outer end connected to a wheel assembly, said upper control arm being split at its inner end into two pivot arms, each of said pivot arms being bent so as to form adjacent dipper shaped areas, first and second connectors joining said inner end to the frame, said first and second connectors each having a hole aligned with a portion of said inner end so as to define a pivot axis fixed with respect to the frame, said upper control arm having a third connector joining said outer end of said upper control arm to said wheel assembly, said upper control arm being connected to said portion of said frame whereby the dipper shaped areas of said upper control arm receive and surround an edge of said frame during maximum upward travel of a wheel relative to said frame without said upper control arm interfering with the frame.

2. The independent suspension of claim 1 further including:

a lower control arm, said lower control arm having connectors for pivotally connecting an inner end of said lower control arm to the vehicle frame about a lower pivot axis which is fixed with respect to the frame, said lower control arm being connected at an outer end thereof to said wheel assembly, said lower control arm being a rigid, generally linear member.

3. The independent suspension of claim 2 wherein each of the connectors of the lower control arm include:

a pivot pin having end portions adapted to be received in pivot blocks carried by the frame, a liner surrounding the pivot pin, a cylindrical sleeve surrounding the liner, a rubber sleeve surrounding the cylindrical sleeve, and a metallic sleeve surrounding the rubber sleeve, said metallic sleeve being dimensioned to be received in a bushing socket formed at a location on said inner end of the lower control arm.

4. The independent suspension of claim 2 further including:

a first ball joint connecting said outer end of said upper control arm to said wheel assembly, a second ball joint connecting said outer end of said lower control arm to said wheel assembly, each of said first and second ball joints including a stud having a tapered section shaped to fit into a tapered aperture, each of said studs having an integral ball at one end and a threaded section at an opposite end for securing the stud and the ball to said wheel assembly, each of said first and second ball joints further including a spherical seat seated in a recess in the outer end of the control arm associated with each of said first and second ball joints and receiving the respective balls, and each of said first and second ball joints further including a boot surrounding each of said studs adjacent to said tapered section of the studs and each of said boots precluding entry of deleterious substances to areas adjacent to said ball of each of said first and second ball joints and said spherical seat of each of said first and second ball joints.

5. The independent suspension of claim 4 wherein the first and second ball joints each include:

a lubricant fitting adjacent to each of said balls whereby the first and second ball joints may be lubricated from their associated control arm without disassembling the first and second ball joints from the control arms.

6. The independent suspension of claim 4 wherein:

the wheel assembly includes a steering knuckle assembly, and the independent suspension further includes a linear steering arm associated with the steering knuckle assembly to which the upper control arm is attached.

7. The independent suspension of claim 2 wherein each of the connectors of the lower control arm include:

a pivot pin having end portions adapted to be received in pivot blocks carried by the frame;

a pair of liners surrounding the pivot pin;

a pair of cylindrical sleeves surrounding the pair of liners;

a pair of rubber sleeves surrounding the pair of cylindrical sleeves; and a pair of metallic sleeves surrounding the pair of rubber sleeves, said metallic sleeves being dimensioned to be received in a bushing socket formed at a location on said inner end of the lower control arm, whereby the pair of liners, the pair of cylindrical sleeves, the pair of rubber sleeves and the pair of metallic sleeves can be assembled to the pivot pin from opposite ends of said pivot pin.

* * * * *